United States Patent [19]

Judd

[11] 4,390,992
[45] Jun. 28, 1983

[54] PLASMA CHANNEL OPTICAL PUMPING DEVICE AND METHOD

[75] Inventor: O'Dean P. Judd, Los Alamos, N. Mex.

[73] Assignee: The United States of America as represented by the United States Department of Energy, Washington, D.C.

[21] Appl. No.: 284,151

[22] Filed: Jul. 17, 1981

[51] Int. Cl.³ ............................................. H01S 3/091
[52] U.S. Cl. ........................................ 372/70; 372/78
[58] Field of Search ................................ 372/55–57, 372/70, 73, 74, 76, 77, 86

[56] References Cited

U.S. PATENT DOCUMENTS

| | | | |
|---|---|---|---|
| 3,149,372 | 9/1964 | Stinger . | |
| 3,163,799 | 12/1964 | Buchman | 372/77 |
| 3,271,696 | 9/1966 | DeMent | 372/77 |
| 3,309,620 | 3/1967 | DeMent | 372/77 |
| 3,414,838 | 12/1968 | DeMent | 372/77 |
| 3,646,471 | 2/1972 | DeMent | 372/77 |
| 3,715,596 | 2/1973 | DeMent | 372/77 |

Primary Examiner—William L. Sikes
Assistant Examiner—Léon Scott, Jr.
Attorney, Agent, or Firm—William W. Cochran, II; Paul D. Gaetjens; Richard G. Besha

[57] ABSTRACT

A device and method for optically pumping a gaseous laser using blackbody radiation produced by a plasma channel which is formed from an electrical discharge between two electrodes spaced at opposite longitudinal ends of the laser. A preionization device which can comprise a laser or electron beam accelerator produces a preionization beam which is sufficient to cause an electrical discharge between the electrodes to initiate the plasma channel along the preionization path. The optical pumping energy is supplied by a high voltage power supply rather than by the preionization beam. High output optical intensities are produced by the laser due to the high temperature blackbody radiation produced by the plasma channel, in the same manner as an exploding wire type laser. However, unlike the exploding wire type laser, the disclosed invention can be operated in a repetitive manner by utilizing a repetitive pulsed preionization device.

15 Claims, 5 Drawing Figures

PLASMA CHANNEL OPTICAL PUMPING DEVICE AND METHOD

BACKGROUND OF THE INVENTION

The present invention pertains generally to lasers and more particularly to optically pumped lasers. This invention is the result of a contract with the Department of Energy (Contract No. W-7405-ENG-36).

The general technique of laser excitation by optical pumping can be described as follows. In the simplest scheme, an atom or molecule, A, is promoted to an excited state, A, by absorption of a photon $$h\nu_p + A \rightarrow A^{}, \tag{1}$$

where $h_p$ is the photon energy of the pump radiation. The system then undergoes stimulated emission by the process $$h\nu_L + A^{**} \rightarrow A^* + 2h\nu_L, \tag{2}$$

where A* is a lower excited state of A, and $h\nu_L$ is the photon energy of the laser radiation. It is also common to photodissociate a molecule, AB, and produce an excited atom or fragment, B*, which then undergoes stimulated emission. A typical reaction sequence is $$h\nu_p + AB \rightarrow A + B^*, \tag{3}$$

$$h\nu_L + B^* \rightarrow B + 2h\nu_L, \tag{4}$$

An example of the latter process is the atomic iodine laser. A gas composed of perfluoroalkyl iodides, RI, is irradiated with an optical source peaked near a wavelength of 270 nm. The reaction sequence is $$h\nu_p(270 \text{ nm}) + RI \rightarrow R + I^*(^2P_{\frac{1}{2}}) \tag{5}$$

$$h\nu_L + I^*(^2P_{\frac{1}{2}}) \rightarrow I^*(^2P_{3/2}) + 2h\nu_L. \tag{6}$$

The wavelength of the laser radiation is 1.315 μm. The laser has been shown to work with a number of compounds such as $CF_3I$, $C_3F_7I$, $CF_3O(CF_3)_2I$, etc. For many compounds, the quantum yield for reaction (5) is near unity, which results in a two-level quantum efficiency of 13.6%. This laser system has been investigated extensively for (1) short-pulsed applications such as laser fusion; (2) long-pulse configurations in which the pulse length varies from 1-500 μs; and (3) cw applications. The optical-pumping technique, however, is applicable to a large class of laser systems other than iodine.

The energy output of the optically pumped laser is determined by the intensity of the optical pump radiation. The overall system efficiency is typically constrained by the efficiency of the pump source. Several high-brightness optical sources have been investigated and developed for pumping lasers; the xenon flash lamp, and the exploding wire.

The brightness of an optical source can be given in terms of the equivalent brightness of a blackbody source with temperature, T, at the same wavelength. The intensity of the source is a nonlinear function of T. A plot of the spectral output intensity, $W(\lambda, T)(W/cm^2\text{-nm})$, as a function of T for several optical wavelengths is shown in FIG. 1. Also shown (dashed curve) is a plot of the maximum value of the blackbody spectral intensity. At 25,000 K., for example, the radiation peaks at 116 nm.

If the spectral intensity, $W(\lambda,T)$, is integrated over all wavelengths, the total radiation intensity $I = \sigma T^4$. This function is also shown in FIG. 1. For the iodine laser, the photoabsorption band peaks near 270 nm and the useful bandwidth for optical pumping is of the order of 50 nm. From the curves, the total output intensity at 25,000 K. is approximately 3.5 kw/cm² nm×50 nm = 0.175 MW/cm². This value is on the order of 8% of the total radiation intensity, I, integrated over all wavelengths. As T increases, the intensity at each wavelength increases. The major portion of the radiation, however, is peaked at shorter uv wavelengths. Consequently, the fraction of the total blackbody energy concentrated at 270 nm is smaller, and the effective efficiency of the optical source is lower.

The results of a more detailed calculation of the in-band intensity and conversion efficiency can be obtained as follows. The in-band intensity is obtained by a direct wavelength integration of $W(\lambda,T)$ over a bandwidth, $\Delta\lambda$, centered at 270 nm. The fraction of the total blackbody radiation, I, that is contained within $\Delta\lambda$ is plotted as a function of the source temperature in FIG. 2 for $\Delta\lambda = 50$ and 100 nm. The source efficiency for in-band pumping drops about a factor of four as the temperature increases from $10^4$ K. to $4\times10^4$ K. However, although efficiency decreases at higher temperatures, the overall output intensity increases.

Various techniques exist for optical pumping in the manner described above. The two optical pump sources used for optically pumped iodine lasers are conventional flash lamps and exploding wires. The general characteristics of the photochemical iodine laser are described below.

The population inversion in the atomic iodine laser is established on the spin-orbit-split components $5^2P_{\frac{1}{2}} 5^2P_{3/2}$ of the electronic ground state, where $^2P_{\frac{1}{2}}(I^*)$ upper level lies 7603 cm$^{-1}$ above the $^2P_{3/2}(I)$ lower level. The radiative lifetime of the upper level is 170 ms, manifesting the magnetic dipole nature of the 1.315 μm transition. Because of coupling of the nuclear and electron spins, there are six hyperfine components of this transition spread over a total range of ~0.5 cm$^{-1}$.

Photolysis of several iodine compounds with the proper wavelength of uv light produces I* with high yield. Measurements have shown that for at least two compounds, $C_3F_7I$ and $CF_3I$, photolysis with 270 nm light produces I* with near-unity quantum efficiency. The compound, $C_3F_7I$, has been experimentally demonstrated by several workers to have the greatest efficiency in a photochemical iodine laser. Also, this compound shows evidence for photolytic reversibility following the uv flash. For these reasons, most energetic photochemical iodine lasers have used $C_3F_7I$ and, in particular, i-$C_3F_7I$ as the parent compound. The photolytic absorption band for $C_3F_7I$ has a peak at 270 nm and a full width at half-maximum (FWHM) of 50 nm. The peak absorption coefficient is $\alpha = 6.2\times10^{-19}$ cm².

Following photolytic production of I*, collisional quenching of the upper laser level can significantly degrade the laser performance. Partners that have the largest cross-sections for quenching are $I_2$, $O_2$, and $H_2O$. Most parent compounds and commonly used buffer gases—Ar, $CO_2$, $SF_6$—all have very small rates for deactivation of I*. In practice then, impurities of $I_2$, $O_2$, and $H_2O$ are reduced with a clean system and pure parent compound, and $I_2$ formed in postphotolysis reactions is removed by flowing the gas mixture.

The gain of an iodine laser amplifier can be very high, often high enough to produce spurious parasitic modes, which oscillate and deplete the stored energy. The problem is to increase the stored energy and/or decrease the net gain. The most straightforward method for increasing the maximum energy storage of an amplifier is to pressure-broaden the laser transition. The peak stimulated emission cross-section is inversely proportional to pressure. At sufficiently low pressures, each hyperfine component of the transition has a Doppler width (FWHM) at room temperature of 250 MHz. Buffer gases, such as Ar, can be added to pressure-broaden the lines to widths in excess of 10 GHz. At these widths, the hyperfine lines overlap and the entire transition has an effective line width of 40 GHz or more. Pressures of buffer gas of 1 atm or more are common. Molecular species, such as $CO_2$, are often used because of the larger pressure-broadening coefficients and because of other effects discussed below. Peak gain coefficients are decreased by approximately a factor of 10 upon adding an atmosphere of $CO_2$ to low pressure $C_3F_7I$.

An undesirable by-product of the primary photolysis event is pyrolysis occurring within the medium. Approximately 1.39 eV of excess energy is generated per photolysis reaction, and some of this energy appears as translational energy of the atomic and radical products. To alleviate pyrolytic effects due to the high temperatures that can develop, buffer gases are added to the parent compound. Monatomic species, such Ar, are used for this purpose, but often a molecular species is used because of its increased heat capacity.

The most widely used pump source for the photochemical iodine laser is the xenon flash lamp. Intense light from a lamp is produced upon discharging a high-energy capacitor through the plasma inside the lamp envelope. The power transfer efficiency to the lamp can approach unity if the dynamic impedance of the lamp is matched properly with the discharge capacitor and circuit inductance.

The operation of xenon flash lamps for laser application has been investigated since the early 1960's. In 1966, Goncz and Newell observed the spectral emission of a conventional lamp at two current densities. This work clearly showed that as the current increased, the uv intensity increased substantially. However, there was only a small increase in brightness temperature measured in the visible portion of the spectrum. For photolysis of iodine compounds near $\lambda = 270$ nm, large current densities are clearly required. These are achieved in practice by adjusting discharge circuit parameters to give short, high-current pulses.

For a blackbody source, the greatest efficiency for pumping a compound such as $C_3F_7I$ is realized when the peak source spectral radiance, $W_\lambda$, lies at $\lambda = 270$ nm. This attention corresponds to a blackbody temperature of $T = 10,600$ K., where approximately 10% of the total radiated power density, I, falls within the 50 nm $C_3F_7I$ absorption band as shown in FIG. 2. Lamp current densities of $\sim 6000$ amps $cm^{-2}$ produce spectral outputs corresponding to this temperature. Measurements have shown that high-current-density flash lamps can deposit approximately 9% of the total radiated power into the $\lambda = 270$ nm absorption band. Under proper conditions, these lamps behave like blackbody radiators when considering emissivity and spectral distribution.

In most experimental arrangements, a quartz laser cell is surrounded by an array of several linear flash lamps, around which is provided a polished aluminum reflective enclosure. Occasionally the enclosure is shaped such that the output of the lamps is concentrated effectively on the laser cell. The active length of these devices ranges between several centimeters and a few meters. Another arrangement utilizes a linear flash lamp placed on the axis of the laser cell with the lasing medium extended to the flash lamp. Both configurations have been used extensively.

Iodine lasers have been operated both as high-power oscillators and oscillator-amplifier configurations. Typical specific energies for these devices fall in the range of 50 J/l. Values as high as 100–200 J/l have been reported.

An early demonstration of a high-power, flash-lamp-pumped, iodine laser was reported in the United States by A. J. DeMaria, and C. J. Ultee, Appl. Phys. Lett. 9, 67 (1966). Using a linear on-axis flash-lamp-pumping configuration, they obtained 65 J in a 1.5 $\mu$s pulse ($10^5$ W) from a lasing volume 20.3 cm in diameter and 137 cm long ($4.44 \times 10^4$ cm$^3$). The energy deposited into the flash lamp was $40.5 \times 10^3$ J. The overall system efficiency was 0.13%. The gas used was $CF_3I$ at 15–30 torr. The specific energy extraction was 1.46 J/l.

One of the best-developed and best-characterized iodine lasers is one constructed at the Max-Planck Institut fur Plasmaphysik in Garching, Germany, which was developed for short-pulsed inertial confinement experiments as disclosed by G. Brederlow, K. J. Witte, K. Hohla, and R. J. Volk, Quant, Elect. QE-12, 152 (1976) and G. Brederlow, R. Brodmann, K. Eidmann, H. Krause, M. Nippus, R. Petsch, R. Volk, S. Witkowski, and K. J. Witte, "The ASTERIX III High Power Iodine Laser, A System Performance Summary," Max Planck Research report PLF-5, Garching, Germany, July 1979. This laser consisted of an oscillator-amplifier chain. The oscillator and pulse-cutting system produced a $TEM_{oo}$, 1 mJ pulse of 1 ns duration. This pulse entered a preamplifier of 2.5 cm diameter, in which 1.5 J/cm$^2$ was stored and 0.6 J was extracted. The module had a length of 1.2 m, and the cell was filled with 40 torr $C_3F_7I$ and 200 torr $CO_2$. The beam then entered the power amplifier where 18 J/l were stored. The module was 2.4 m in length, and the cell was 7.7 cm in diameter and filled with 22 torr $C_3F_7I$ and 560 torr $CO_2$. The $C_3F_7I$ pressure in the power amplifier was lower than the pressure in the preamplifier because it was desirable for beam-quality not to exceed a certain pressure-diameter (pD) product. This design consideration addresses pump light depletion as the uv light travels radially inward in the medium. The Garching design employed a pD = 170 torr cm. The cell was surrounded by several flash lamps driven by a total of approximately 30 kJ. An energy of 150 J was stored in the power amplifier, of which 60 J was extracted in a 1 ns pulse. A conversion efficiency of 0.5% of capacitor-stored energy to inversion energy was typical. The Garching group has achieved as much as 0.8% conversion efficiency in other experiments. The specific energy in this power amplifier was 18 J/l, but could be raised to 60 J/l, by greater input energy to the lamps and by using an oscillator configuration for the module.

Greater conversion efficiencies and specific energies have been reported by Soviet researchers A. S. Antonov, I. M. Belousova, V. A. Gerasimov, O. B. Danilov, A. P. Zhevlakov, N. V. Sapelkin, and I. L. Yachnev, Sov. Tech. Phys. Lett. 4, 459 (1978) reported a 1 kJ output from a power oscillator, with a conversion efficiency of 1.4%. The cell was 2 m in length and 20 cm in diameter. A single flash lamp, 6 cm in diameter, lay inside the cell on its axis and was immersed in the laser gas. Of the capacitor-stored energy, 80% was dissipated in the lamp and 6-7% appeared as uv radiation in the $270\pm20$ nm pump band. The lamp brightness temperature, as measured in the uv, was approximately 20,000 K. At 25 torr n-$C_3F_7I$ and 75 torr $SF_6$ the specific output energy was 50 J/l, the total laser energy output energy was 1 kJ, and the overall efficiency was 1.4%. The pulse duration was approximately 70 $\mu s$. Much of the large conversion efficiency can be accounted for by the very good coupling of the medium to the lamp embedded in it.

The highest reported specific output energy was reported by O. B. Danilov, V. G. Korolenko, and I. L. Yachnev, Sov. Phys. Tech. Phys. 3, 82 (1977). In this work, up to 200 J/l were measured at $C_3F_7I(CF_3I)$ pressures at 100 torr. According to the authors, this good performance was due in part to the laser mixture used. Pyrolysis of the parent compound $CF_3I$ or $C_3F_7I$, was alleviated by using $C_6F_{14}$ as a buffer gas. A separate uv probe beam monitored the quantity of $I_2$ during the pump pulse. The experiment demonstrated that an increase in $I_2$ concentration is associated with laser cutoff. The authors also mention the possibility of the $C_6F_{14}$ entering into the chemical kinetics of the systems.

In summary, the flash lamps for these lasers must be operated in the high-current density mode to efficiently produce uv output. Emission temperatures lie in the 10,000-20,000 K. range. Overall laser efficiencies are usually in the 0.5% range, but 1.4% have been reported. Energy storage densities of 20-200 J/l have been measured. These numbers are driven by the capability of the lamps to generate uv radiation in iodine compound absorption bands with ~6% efficiency.

Use of exploding wires as a light source for pumping solid-state lasers was investigated as early as the mid-sixties by Soviet researchers. Exploding-wire technology consists basically of discharging a high-energy capacitor bank through a thin wire stretched between two electrodes in the lasing medium. It has been demonstrated that the wire itself is a "seed" to initiate the high-power discharge through the gas between the two electrodes. The characteristics of the plasmas formed in this manner have been investigated for approximately 30 years.

One example of this type of work is by N. G. Basov, B. P. Borovich, V. S. Zuev, V. B. Rozanov, Yu. Yu. Stoilov, Sov. Phys. Tech. Phys. 15, 599 (1970). They investigated, experimentally and theoretically, several characteristics of a high-power discharge in air. A capacitor bank of 30 $\mu f$, charged to 50 kV, was discharged through 100 $\mu m$ diameter wires immersed in air between two electrodes. Typical wire lengths were 20 cm, and the pressure of the air was atmospheric.

Amplitudes of the ringing current pulse were up to 400 kA, accompanied by 25 kJ deposited in the discharge in a 20 $\mu s$ pulse. Under these and similar conditions, the radiation temperature, measured at $\lambda=240$, 334, and 500 nm, was ~45,000 K. over a duration of 2 $\mu s$. Of the energy dissipated in the discharge (60% of the capacitor stored energy), 20% appeared as radiated energy at wavelengths longer than 186 nm. The overall conversion efficiency was 12%. The discharge column behaved like a radiating blackbody over the uv and visible range of the optical detection system.

Observations with a framing camera showed that a cylindrical shockwave moved out from the central region during the current pulse with a velocity of ~2.5 km/s. The plasma column expanded immediately behind the shock front at a slightly lower velocity. The authors point out that the radiated power-per-unit surface area is 15 times greater than that produced by flash lamps in the visible region of the spectrum. It is possible that an even greater ratio applies to the uv emission.

Exploding metal foil technology is closely related to exploding wires, although exploding metal foils have not been used as pump sources for lasers. V. I. Baikov, V. V. Blagoveshchenskii, B. G. Komkov, and Yu. T. Mazurenko, Sov. Phys. Tech. Phys. 20, 708 (1976) reported the use of exploding metal foils of 0.1-30 microns thickness in air. They were especially interested in the radiation generated by this discharge. Energies of 40-600 J are dissipated in these $1.5\times10$ cm aluminum strips in a time of ~5 $\mu s$. They found that ~35% of the input energy is converted to total radiation, and 25% into radiation between 100 and 400 nm. Brightness temperatures up to 35,000 K. were measured from these large area emitters.

In 1974 the Soviets began reporting the use of exploding wires as pump sources for final amplifier stages of iodine laser systems. In these amplifiers, the wire is located along the axis of the cylinder containing the laser mix. Therefore, there is no requirement for a wall between the "open discharge" and the active medium being pumped. The resulting active medium is the annular region between the shock front at the time of lasing and the cylinder wall.

The first reported work of this type was by N. G. Basov, L. E. Golubev, V. S. Zuev, V. A. Katulin, V. N. Netemin, V. Yu. Nosach, O. Yu. Nosach, and A. L. Petrov, Sov. J. Quant. Electron. 3, 524 (1974) and N. G. Basov, V. S. Zuev, V. A. Katulin, A. Y. Lyubchenko, V. Y. Nosach, and A. L. Petrov, Sov. J. Quant. Electron. 9, 174 (1974), in which the amplifier tube was 15 cm in diameter by 80 cm in length. In a mixture of $C_3F_7I$ and $SF_6$, a 30 $\mu s$ long discharge produced a 30,000 K. emission temperature. The 100 J of stored energy in the amplifier was 0.4% of that stored in the capacitor bank. The output from this power amplifier was 50 J in a 5 ns pulse when the input energy was 1.2 J.

A later paper by A. V. Antonov, N. B. Basov, V. S. Zuev, V. A. Katulin, K. S. Korol'kov, G. V. Mikhailov, V. N. Netemin, F. A. Nikolaev, V. Yu. Nosach, O. Yu. Nosach, A. L. Petrov, and A. V. Shelobolin, Sov. J. Quant. Electron. 5, 123 (1975) describes a larger amplifier in this laser system. The metal cylinder had a 36 cm clear aperture and a length of 1.5 m. The energy discharged through the axial tungsten wire and gas mixture between the two electrodes was 200 kJ in 60 $\mu s$. The cylinder contained 8 torr of $C_3F_7I$ mixed with $SF_6$. In an optimized oscillator configuration, the output from this module was 720 J. A value of 65% of the capacitor energy was dissipated in the discharge, and of this, 0.6% appeared as laser radiation.

An improved version of this device was reported by V. A. Katulin, V. Yu. Nosach, and A. L. Petrov, Sov. J. Quant. Elect. 6, 998 (1976) that achieved an output energy of 1200 J from a volume 32 cm in diameter and 134 cm long. This output energy represents 1% of the energy supplied to the discharge. It was reported that the stored energy density was found to be independent of radius throughout the medium, but that the free-oscillation energy density was a factor of four to six times lower at the periphery than on the axis of the pumped volume.

A very detailed description of an exploding-wire iodine laser (and perhaps the best) has been reported by B. L. Borovich, V. S. Zuev, V. A. Katulin, V. Yu. Nosach, O. Yu. Nosach, A. V. Startsev, and Yu. Yu. Stolov, Sov. Quant. Elect. 9, 695 (1975). The discharge length was 63 cm, and the laser produced an output in the range of 100 J. The energy extraction varied from 20–45 J/l. The measured overall optical-source conversion efficiency for in-band uv photons at 270 nm to stored electrical energy, was 8%. Two important concepts were discussed in this report that have a major impact on optically pumped laser design. It was pointed out that if the intensity of the optical source is sufficiently large, the pump radiation can "bleach" the photoabsorption in the lasing medium and remove the constraint on the product, PD, of laser diameter and pressure of the iodine compound. Under these conditions, a photodissociation wave is formed that moves into the lasing medium with a velocity, $V_D$, that is approximately proportional to the ratio of the uv flux, $\phi$ to p, i.e. $V_D \approx \phi/n$, where n is the number density of the photoabsorber. This mechanism provides the means of pumping a much larger diameter lasing medium, and consequently the realization of a laser with higher energy output. This concept was also proposed by G. A. Skorobogatov, Sov. Tech. Phys. Lett. 1, 209 (1975). In this paper he formulates a theoretical model for the bleaching wave process, discusses detached and attached bleaching waves, and proposes an application to the iodine-laser system.

The second important feature that was pointed out was the degradation of the uv intensity from the exploding-wire source due to photon absorption in a heated layer in front of the expanding shock.

In a recent conference presentation, the paper by V. S. Zuev, presented at the Lasers 79 Conference, Orlando, Florida (1979), reported an output energy of 1.0 kJ from an iodine laser pumped by an exploding wire. The cylindrical configuration was 2 m long and 30 cm in diameter; the overall efficiency was 2%.

An important aspect of this type of laser is the optical beam quality that can be obtained during the pumping and laser duration. Investigation of this aspect of the laser operation has been addressed extensively by Borovich et al. (1975), supra, G. A. Kirillov, S. B. Kormer, G. G. Kochemasov, S. M. Kulikov, V. M. Murugov, V. D. Nikolaev, S. A. Sukharev, and V. D. Urlin, Sov. J. Quant. Electron. 5, 369 (1976), B. V. Alekhin, V. V. Borovkov, B. V. Lazhintsev, V. A. Nov-Arevyan, L. V. Sukhanov, and V. A. Ustinenko, Sov. J. Quant. Electron. 9, 1148 (1979), and A. I. Zaretskii, L. I. Zykov, G. A. Kirillov, S. B. Kormer, V. M. Murugov, V. D. Nikolaev, and S. A. Sukharev, Sov. J. Quant. Electron. 9, 751 (1979). The general result is that the beam divergence is good. Nominally 80% of the energy is contained within divergence angle of $10^{-4}$ radians. Inhomogeneities due to optical pumping and shock disturbances are minimal. Some inhomogeneity does occur under laser conditions. The scale length of the inhomogeneity is 0.04 cm, which results from heating of the medium by the recombination reaction, $$R + I \rightarrow RI,$$

as disclosed by V. S. Zuev, V. N. Netemin, and O. Yu Nosach, Sov. J. Quant. Electron. 9, 522 (1979), where R is the radical in the parent iodine compound, RI. The effect is greatly enhanced under laser conditions since more ground-state iodine atoms are being produced. The threshold for this effect is $10^4$–$10^5$ W/cm$^2$. Other studies indicate that the optical inhomogeneities depend upon the ratio of the average molecular weight of the gas mixture to the number of gas molecules in the mixture (M/N) (Zaretskii et al. 1979, supra). The beam divergence is proportional to M/N.

From the results reported to date, the performance of iodine lasers pumped by flash lamps or exploding wires is comparable. The efficiency of flash-lamp pumping is somewhat higher, while the energy output and intensity with exploding-wire pumping is larger. These results can be understood in terms of the higher blackbody temperature of the exploding wire. For the exploding wire, $T \approx 40,000$ K., so that a smaller fraction of the total radiated energy occurs in the 270 nm spectral band of the iodine photoabsorber. The absolute intensity is larger, however, than the flash-lamp source (10,000–20,000 K.). From the viewpoint of a high-energy laser, the exploding-wire concept is preferred because a larger energy can be coupled into the optical source and produce a higher output intensity at a given wavelength.

However, the disadvantage of the exploding-wire technique is that repetitive operation is either impossible or difficult to achieve since the wire must be replaced for each operation.

Consequently, it would be desirable to operate the laser in a repetitive manner using a high temperature ($\sim 40,000$ K.) blackbody source of radiation along the axis of the laser, in the same manner as the exploding wire.

SUMMARY OF THE INVENTION

It is therefore an object of the present invention to provide an optical pumping device for a repetitively operated gaseous laser.

It is also an object of the present invention to provide a device for optically pumping a lasing medium in a repetitive manner in a gaseous laser.

Another object of the present invention is to provide a method of optically pumping a repetitively operated gaseous laser.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise an optical pumping device for a repetitively operated gaseous laser comprising a gaseous lasing medium; electrodes disposed in said gaseous lasing medium; means for providing an electrical potential between said electrodes; laser means for generating a repetitive pulsed laser beam which produces a substantially uniform longitudinal preionization path in said gaseous lasing medium in the axial direction of said laser between said electrodes sufficient to cause said electrical potential to produce an electrical discharge between said electrodes to form a plasma channel along said preionization path; whereby said plasma channel produces sufficient blackbody radiation to optically pump said lasing medium in a repetitive manner.

The present invention may also comprise, in accordance with its objects and purposes, a device for optically pumping a lasing medium in a repetitive manner in a gaseous layer comprising electrodes disposed within said lasing medium at opposite longitudinal ends of said laser; means for providing an electrical potential between said electrodes; accelerator means for generating a pulsed electron beam which produces a sufficiently uniform longitudinal preionization path along the axial direction of said laser between said electrodes to cause said electrical potential to produce an electrical discharge between said electrodes to form a substantially uniform plasma channel along said preionization path; whereby said substantially uniform plasma channel produces sufficient blackbody radiation to optically pump said lasing medium.

The present invention may also comprise, in accordance with its objects and purposes, a method of optically pumping a repetitively operated gaseous laser comprising placing electrodes at opposite axial ends of said gaseous laser in a predetermined gaseous lasing medium; providing an electrical potential between said electrodes; producing a substantially uniform repetitive preionization path in said predetermined gaseous lasing medium in the axial direction of said laser between said electrodes; providing an electrical potential between said electrodes having sufficient magnitude and current to produce a plasma channel between said electrodes, guided by said preionization path, having a blackbody temperature which is capable of optically pumping said gaseous lasing medium.

The advantage of the present invention is that it allows for repetitive operation while still providing a high temperature blackbody radiation source in the form of a plasma channel which is capable of optical pumping to produce a high energy laser. Since the plasma channel runs along the axial diretion of the laser, efficient optical pumping is provided. Also, the pump radiation may bleach the photoabsorption in the lasing medium to further aid in achieving high output intensities.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
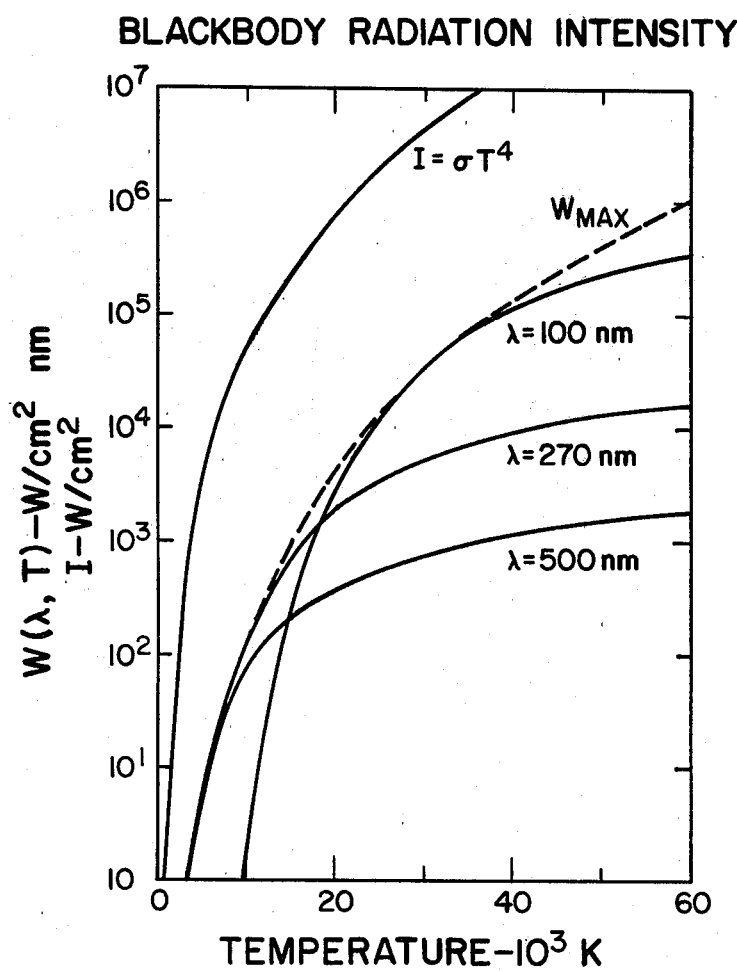
FIG. 1 comprises a graph of spectral intensity of a blackbody source, $W(\lambda,T)$, as a function of temperature at several optical wavelengths. The maximum intensity at a given optical wavelength is shown as a dashed curve.
Figure 2:
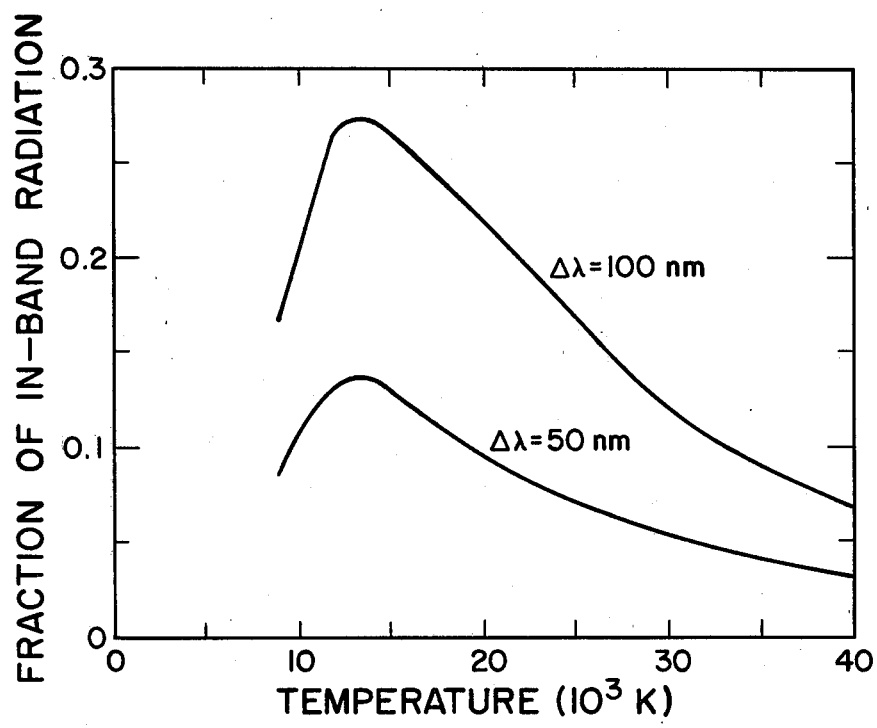
FIG. 2 is a graph illustrating the fraction of the total blackbody radiation in a bandwidth, $\delta\lambda$.

The concept of the present invention is the use of a substantially uniform low density ionization path which is produced in the axial direction of the laser to initiate a discharge between two electrodes so as to generate a plasma channel which radiates high temperature blackbody radiation in a manner similar to an exploding wire. In other words, a preionization path generated by a laser or electron beam guides the formation of a plasma channel in the same manner as the thin exploding wire. In accordance with the present invention, however, the preionization beam can be prolonged repetitively so that the high energy laser can also be repetitive. The energy for pumping the high energy laser originates from the electrical storage source and not from the preionization beam.

This technique can be used on various optical lasing media such as $I_2$, XeO, HgBr, $S_2$, XeF, and I.

Of course, the laser kinetics involved in each of these gaseous lasing media determines the output intensity which can be achieved. As an example, the laser kinetics of the iodine laser are described in detail to set forth the various criteria utilized in an optically pumped iodine laser. Similar considerations can be made for the XeO, HgBr, $S_2$, and XeF lasers which are of interest in accordance with the present invention. Of course, other suitable gaseous lasing media can be utilized in accordance with the present invention depending upon the suitability of such gaseous lasing media being optically pumped by a high temperature blackbody radiation source.

The kinetic processes that are important in the iodine laser are listed in Table 1. Also indicated are the appropriate rates. The primary photolysis produces excited iodine atoms from the parent compound, RI, with a quantum yield, f. For $C_3F_7I$, $f \geq 0.99$. For most other iodine compounds, f is less than this value. Values of f for several different parent compounds are summarized in Table 2.

TABLE 1

| Process | Rate cm$^3$/s; cm$^6$/s |
|---|---|
| (1) $RI + h\nu_{p1} \xrightarrow{f} \begin{array}{c} R + I^* \\ R + I \end{array}$ | |
| (2) $RI \rightarrow R + I + E$ | $10^{13} \exp(-54,000/RT)$ |
| (3) $I^* + R \rightarrow RI$ | $1.5 \times 10^{-12}$ |
| (4) $I^* + I_2 \rightarrow I + I_2$ | $3.6 \times 10^{-11}$ |
| (5) $I + R \rightarrow RI$ | $5 \times 10^{-11}$ |
| (6) $I + I + M \rightarrow I_2 + M$ | $6.7 \times 10^{-33}$ |
| (7) $R + R \rightarrow R_2$ | |

TABLE 2

Fractional Yields, $\rho^*$, of Excited Iodine Atoms Following the Broad-Band Ultraviolet Photolysis of Various Alkyl Iodides

| Compound | $\rho^*$ |
|---|---|
| $CH_3I$ | $0.92 \pm 0.02$ |
| $C_2H_5I$ | $0.69 \pm 0.05$ |
| $n\text{-}C_3H_7I$ | $0.67 \pm 0.04$ |
| $i\text{-}C_3H_7I$ | $<0.10$ |
| $n\text{-}C_4H_9I$ | $0.82 \pm 0.04$ |
| $s\text{-}C_4H_9I$ | $<0.10$ |
| $i\text{-}C_4H_9I$ | $0.69 \pm 0.04$ |
| $t\text{-}C_4H_9I$ | $<0.10$ |
| $CO_3I$ | $0.99$ |
| $CF_3I$ | $0.91 \pm 0.03$ |
| $C_2F_5I$ | $<0.98$ |
| $n\text{-}C_3F_7I$ | $<0.99$ |
| $i\text{-}C_3F_7I$ | $0.90 \pm 0.02$ |
| HI | $0.10 \pm 0.05$ |

The excited-state atoms can be deactivated by several collision partners, a process which competes directly with stimulated emission. The strongest deactivation occurs with $I_2$, $O_2$, and certain parent radicals, R. Rate constants for collisional deactivation of $I(^2P_{\frac{1}{2}})$ by a number of partners are summarized in Table 3.

Recombination reactions are also important. The primary channel for $I_2$ production is three-body recombination of the iodine atom. The fastest reaction occurs with I as the third body. A competing process for I atoms is recombination with the parent radical. The rate constant is typically a factor-of-five larger for ground-state atoms than for excited atoms. In order to stabilize the molecular product of the recombination, the excess energy, which is comparable to the bond energy, must be converted into translational energy in the gas. This causes localized gas heating, and can contribute to density gradients in the lasing medium. Since the rate process is larger for ground-state atoms, this effect is particularly important during lasing. The competing channel for radical disappearance is dimerization. Typically this rate constant is large.

An important process, which competes with photolysis, is pyrolysis of the parent compound. The energy absorbed by the molecule from a photon in the radiation field is 4.59 eV at 270 nm. The bond energy for $i\text{-}C_3F_7I$ is 2.26 eV, and the $I(^2P_{\frac{1}{2}})$ state is located at an energy of 0.94 eV. Consequently an excess energy of 1.39 eV appears as translational energy in the medium. The increased temperature causes pyrolysis of the parent iodine compound, with the fragment iodine atom in the ground state. Besides competing with the primary photolysis channel, this reaction also provides a channel for production of $I_2$, which is detrimental to the laser process.

TABLE 3

Rate Constants for Collisional Deactivation of $I(^2P_{\frac{1}{2}})$ at 300 K

| Quenching Species | k(cm3-molecule-1s-1) |
|---|---|
| He | $<5 \times 10^{-18}$ |
| Ar | $<2 \times 10^{-18}$ |
| Xe | $<1.6 \times 10^{-18}$ |
| $I(^2P_{3/2})$ | $<1.6 \times 10^{-14}$ |
| $H_2$ | $8.8 \times 10^{-14}$ |
| $D_2$ | $2.2 \times 10^{-15}$ |
| $N_2$ | $1.5 \times 10^{-16}$ |
| CO | $1.2 \times 10^{-15}$ |
| $CO_2$ | $1.3 \times 10^{-16}$ |
| $N_2O$ | $1.7 \times 10^{-16}$ |
| | $1.3 \times 10^{-15}$ |
| $SF_6$ | $3.1 \times 10^{-15}$ |

TABLE 3-continued

Rate Constants for Collisional Deactivation of $I(^2P_{\frac{1}{2}})$ at 300 K

| Quenching Species | k(cm3-molecule-1s-1) |
|---|---|
| $CH_4$ | $5.9 \times 10^{-14}$ |
| | $1 \times 10^{-13}$ |
| $CF_4$ | $4.5 \times 10^{-15}$ |
| | $4.6 \times 10^{-16}$ |
| HI | $1.5 \times 10^{-13}$ |
| | $1.3 \times 10^{-13}$ |
| DI | $1.2 \times 10^{-13}$ |
| $H_2O$ | $2.3 \times 10^{-12}$ |
| ICN | $6.0 \times 10^{-14}$ |
| NO | $1.1 \times 10^{-11}$ |
| $O_2$ | $2.5 \times 10^{-11}$ |
| $i\text{-}C_3H_7$ | $3 \times 10^{-10}$ |
| $I_2$ | $3.6 \times 10^{-11}$ |
| $CH_3I$ | $2.6 \times 10^{-13}$ |
| | $5.7 \times 10^{-13}$ |
| $HC_2H_5I$ | $1.9 \times 10^{-13}$ |
| | $6.1 \times 10^{-13}$ |
| $n\text{-}C_3H_7I$ | $2.0 \times 10^{-13}$ |
| | $6.3 \times 10^{-13}$ |
| $i\text{-}C_3H_7I$ | $2.0 \times 10^{-13}$ |
| | $6.3 \times 10^{-13}$ |
| $CO_3I$ | $4.6 \times 10^{-15}$ |
| | $1.8 \times 10^{-14}$ |
| $CF_3I$ | $3.5 \times 10^{-16}$ |
| $C_2F_5I$ | $1.1 \times 10^{-16}$ |
| $n\text{-}C_3F_7I$ | $8 \times 10^{-16}$ |
| | $\sim 2 \times 10^{-16}$ |
| $i\text{-}C_3F_7I$ | $\sim 3 \times 10^{-16}$ |

The overall conversion efficiency of the laser can be increased significantly if the radiation acceptance band of the parent iodine compound is increased. It is important, however, to preserve the high quantum yield for production of the $I(^2P_{\frac{1}{2}})$ excited state, and not introduce photolysis or pyrolysis fragments that deactivate the excited-state species. This limits considerably the number of parent compounds that can be used for this purpose.

Figure 3:
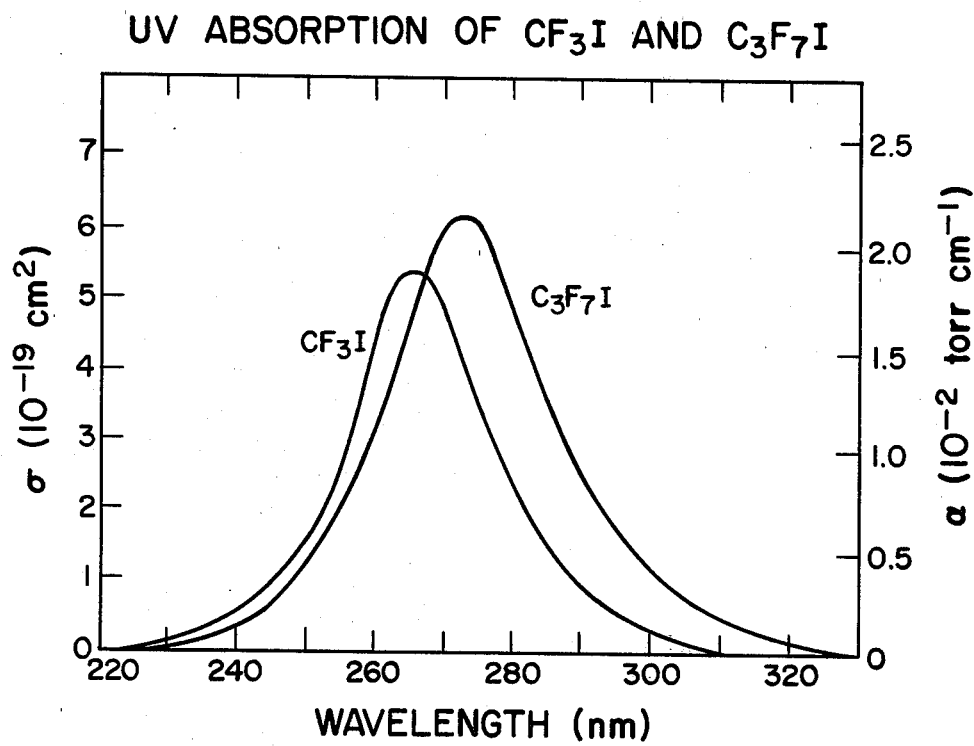
FIG. 3 is a graph of the spectral absorption in $CF_3I$ and $C_3F_7I$.
Figure 4:
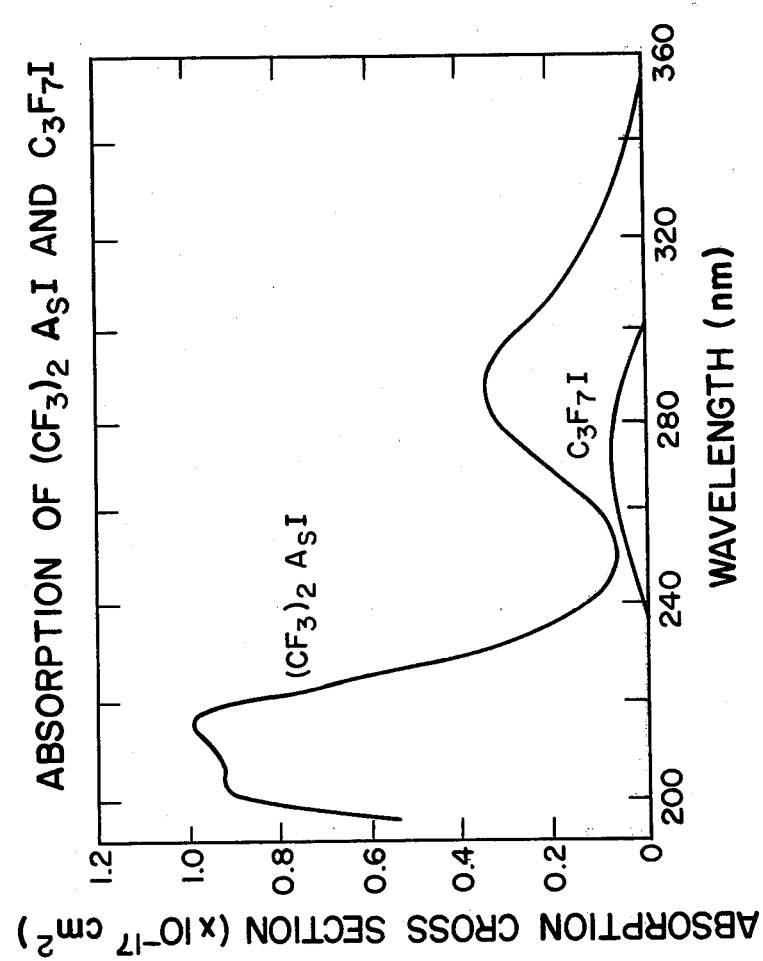
FIG. 4 is a graph illustrating the comparison of the spectral absorption in $C_3F_7I$ and $(CF_3)_2AsI$.

The typical spectral width of the absorption band for $CF_3I$ and $C_3F_7I$ is 36–50 nm. A plot of the spectral absorption cross-sectoins is shown in FIG. 3. The photolytic process results in the rupture of a C-I bond with a near-unity quantum yield, and the resulting fragments are relatively ineffective in deactivating the upper laser level. Studies have also been performed of compounds for which the photolysis resulted in a P-I, $A_s$-I, and $S_b$-I bonds rupture (Birich et al., JETP Lett. 19, 27 (1974)). Lasing was obtained with several compounds that are summarized in Table 4. A typical comparison of the photoabsoprtion cross-section for $(CF_3)_2A_sI$ and $nC_3F_7I$ is shown in FIG. 4. The Group V compounds show similar absorption spectra (within a 100 A relative shift). In general, the Group V compounds exhibit two distinct absorption bands. The long wavelength band peaks near 290 nm and is responsible for the production of the I atoms. The fragments that result from the short wavelength band are not well known, but have been shown to degrade the laser energy. For example, when the radiation spectrum is limited to $\lambda > 240$ by a suitable filter, the energy of the laser is typically increased by a factor of two.

In almost all experiments to date with the Group V compounds, the laser energy terminates abruptly as the energy is increased. This is attributed to pyrolysis of the parent compound.

TABLE 4

| As-I | P-I | Sb-I |
|---|---|---|
| (CF$_3$)$_2$As I | (CF$_3$)$_2$PI | (CF$_3$)$_2$SbI |
| CF$_3$(C$_2$F$_5$)AsI | (CF$_3$(C$_2$F$_5$)PI | |
| CF$_5$(C$_3$F$_7$)AsI | (CF$_3$(C$_3$F$_7$)PI | |
| (C$_2$F$_5$)$_2$AsI | (C$_2$F$_5$)$_2$PI | |
| (C$_3$F$_7$)$_2$AsI | (C$_3$F$_7$)$_2$PI | |
| | CF$_3$(CH$_3$)PI | |
| | CF$_3$PI(CN) | |
| | CF$_3$(CF$_2$Cl)(CFH)PI | |
| | F$_3$PI | |
| | OPF$_2$I | |

Experiments have shown that, with the addition of an inert buffer gas, the pumping energy and consequent laser output can be doubled. It has also been pointed out that reducing the pump pulse duration from 40 µs to 5 µs provides a significant increase in the pump energy before termination of the laser pulse occurs.

The long wavelength band almost certainly gives rise to grount-state atoms I($^2$P$_{3/2}$), as well as the excited-state species. Other studies with (CF$_3$)$_2$PI have suggested that I($^2$P$_{3/2}$) is also produced in the short wavelength band (see B. P. Dymov and G. A. Skorobogatov, Sov. Phys. Tech. Phys. 23, 73 (1978) and G. A. Skorobogatov, V. G. Seleznev, B. N. Maksimov, and O. N. Slesar, Sov. Phys. Tech. Phys. 20, 1533 (1976)). In either case, this results in a production channel for I$_2$, either by the direct photolysis process or by a pyrolysis process. The resulting I$_2$ deactivates the upper laser level. The fact that the laser terminates abruptly suggests that pyrolysis in the dominant process, since the small rise in temperature can give rise to a rapid increase in pyrolysis fragments. A more detailed discussion of the kinetics of these processes supports this conclusion (see C. C. Davis, R. J. Pirkle, R. A. McFarlane, and G. J. Wolga, IEEE J. Quant. Elect. QE-12, 334 (1976)). Work with other compounds has also been reported (Skorobogatov et al. 1976, surpa).

An effect that must be included in this discussion is the photodissociation of I$_2$ that occurs at 499 nm. This introduces a competing channel for the formation of I$_2$ such as disclosed by L. K. Gavrilina, V. Y. Karpov, Y. S. Lenov, V. A. Sautkin, and A. A. Filyukov, JETP 35, 258 (1972) and I. M. Belousova, N. G. Gorshkov, O. B. Danilov, V. Y. Zalesskii, and I. L. Yachnev, Sov. Phys. JETP 38, 254 (1974).

From the previous work that has been reported, it appears that iC$_3$F$_7$I, n-C$_3$F$_7$I, C$_2$F$_5$I, and CD$_3$I best satisfy the photoabsorber performance criteria outlined previously. The quantum yields of several alkyl, perfluoroalkyl, and deuteroalkyl iodides for broad-band radiation have also been measured by T. Donahue and J. R. Wiesenfeld, Chem. Phys. Lett. 33, 176 (1975).

Figure 5:
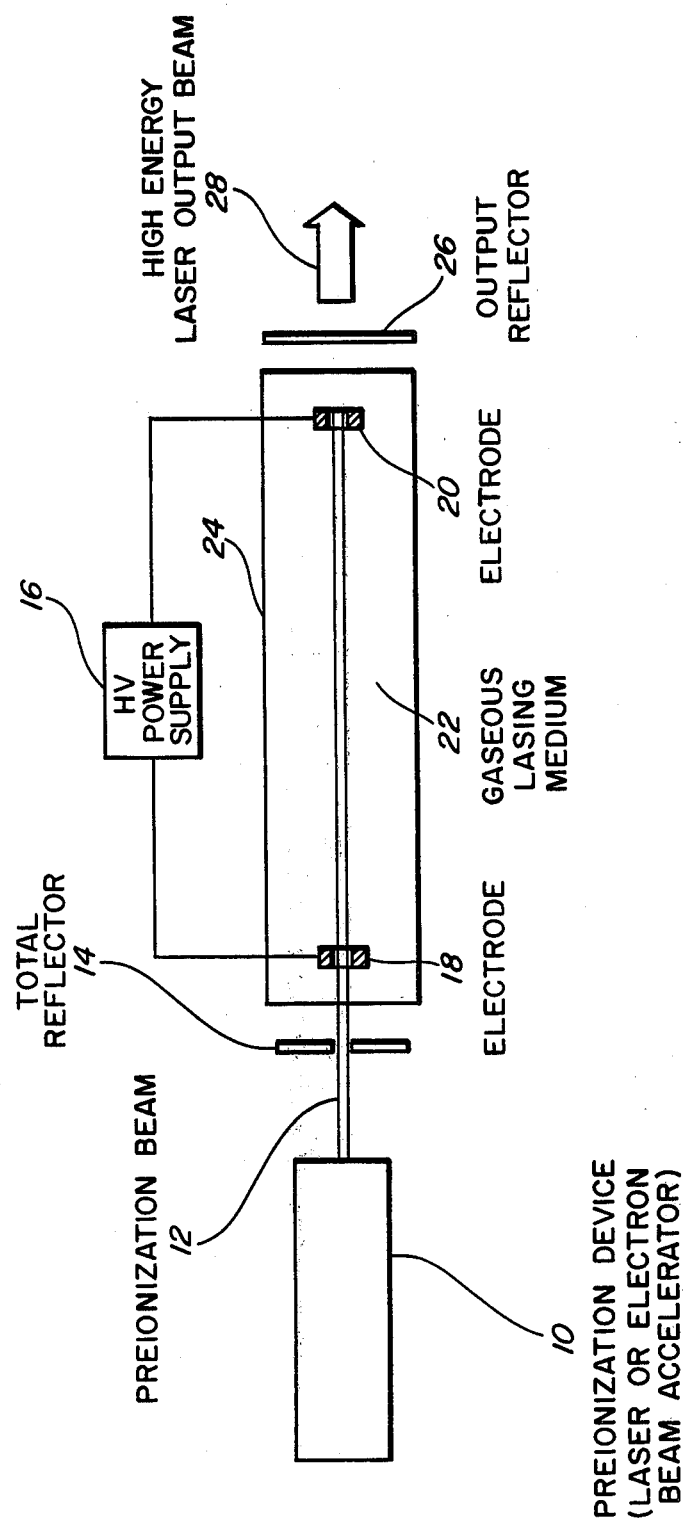
FIG. 5 is a schematic illustration of the device of the present invention.

FIG. 5 schematically discloses a device for carrying out the present invention. As illustrated in FIG. 5, a preionization device 10 such as a laser or electron beam accelerator produces a preionization beam 12 which is directed through a hole in total reflector 14. A high voltage power supply 16 provides an electrical potential between electrodes 18 and 20. A gaseous lasing medium 22 is contained within a gaseous lasing medium confining structure 24. Output reflector 26 comprises a partial reflector for emitting the high energy output laser beam 28.

In operation, preionization device 10 produces a pulsed preionization beam 12 which is directed through a total reflector 14 and electrodes 18 and 20 and generates a low density, substantially uniform, longitudinal preionization path in gaseous lasing medium 22 between electrodes 18 and 20. Sufficient ionization is produced along the preionization path and a sufficient electrical potential between electrodes 18 and 20 is provided to cause an electrical discharge between electrodes 18 and 20 resulting in the formation of a plasma channel guided by the preionization path. The pulsed preionization beam 12 is terminated as soon as the electrical discharge and plasma channel are formed in the gaseous lasing medium. The plasma channel formed along the preionization path between electrodes 18 and 20 has a duration determined by the storage capacity of the capacitor bank of high voltage power supply 16. The low ion density path provided by the preionization beam 20 need only provide approximately 1% ionization of the gaseous lasing medium 22 to initiate the electrical discharge and formation of the plasma channel. The ion density consequently falls in the range of 10$^{16}$–10$^{17}$ ions/cm$^3$. The low density ionization path functions in the same manner that the thin wire functions in the exploding wire device as disclosed above. Blackbody radiation is generated by the plasma channel which is formed in the gaseous lasing medium. The plasma channel produces sufficient blackbody radiation to optically pump the gaseous lasing medium 22. Consequently, the source of power for optically pumping gaseous lasing medium 22 is supplied by the high voltage power supply 16 rather than preionization device 10, which merely acts as a "seed source" for initiating the discharge between electrodes 18 and 20. With appropriate power supply recharge at the capacitor bank of high voltage power supply 16 and a repetitively operated preionization device 10 which is capable of forming a repetitive preionization beam 12, the operation of the high energy laser disclosed in FIG. 5 can also be made repetitive, and retain all the advantages of the exploding wire laser disclosed above.

Various lasers can be utilized to provide the preionization beam 12. For example, the ND:YAG laser operating at 1.06 µm and the CO$_2$ laser operating at 10.6 µm can be used in addition to other known lasers. Operating parameters and examples of laser-induced high current discharges over long distances are disclosed by D. W. Koopman and K. A. Saum, J. Appl. Phys. 44, n. 12, 5328 (1973); D. W. Koopman and T. D. Wilkerson, J. Appl. Phys. 42, n. 5, 1883 (1971); V. D. Zvorykin, F. A. Nikolaev, I. V. Kholin, A. Yu. Chugunov, and A. V. Shelobolin, Sov. J. Plasma Phys. 5(5), 638 (1979); O. B. Danilov and S. A. Tul'skii, Sov. Phys. Tech. Phys. 23(10), 1164 (1978); V. A. Parfenov, L. N. Pakhomov, V. Yu. Petrun'kin, and V. A. Podlevskii, Sov. Tech. Phys. Lett. 2, n. 8, 286 (1976); and J. R. Vaill, D. A. Tidman, T. D. Wilkerson, and D. W. Koopman, App. Phys. Lett. 17, n. 1, 20 (1970).

Examples of suitable electron beam accelerator devices for forming preionization beam 12 are disclosed in U.S. Pat. Nos. 4,189,686, 4,193,043, and U.S. patent application Ser. No. 90,846 filed Nov. 2, 1979, now U.S. Pat. No. 4,287,488. The contemplated structure of these devices comprises the miniaturized RF linacs which are capable of producing high energy relativistic electron beams on the order of 10 MeV or greater. Magnetic field coils can also be used for confining the beam within the gaseous lasing medium 22, such as disclosed in U.S. Pat. No. 4,193,043.

Consequently, the present invention provides an optical pumping device for a repetitively operated gaseous laser which is simple and inexpensive to implement. Moreover, the optical intensity of the blackbody pump radiation of the plasma channel is higher than conventional flash lamp devices and the pump radiation is more effectively coupled to the lasing medium because of its location at the center along the axis of the laser device. Although the details of the iodine laser have been disclosed in considerable detail, both $I_2$ and XeF constitute preferred gaseous lasing media.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical pumping device for a repetitively operated gaseous laser comprising:
   a gaseous lasing medium;
   electrodes disposed in said gaseous lasing medium;
   means for providing an electrical potential between said electrodes;
   laser means for generating a repetitive pulsed laser beam which produces a substantially uniform longitudinal preionization path in said gaseous lasing medium in the axial direction of said laser between said electrodes sufficient to cause said electrical potential to produce an electrical discharge between said electrodes to form a plasma channel along said preionizatoin path,
   said plasma channel having sufficient blackbody radiation determined by said means for providing an electrical potential to optically pump said lasing medium in a repetitive manner.

2. The device of claim 1 wherein said gaseous laser medium comprises $I_2$.

3. The device of claim 1 wherein said gaseous laser medium comprises XeF.

4. The device of claim 1 wherein said gaseous laser medium comprises I.

5. The device of claim 1 wherein said gaseous laser medium comprises $S_2$.

6. The device of claim 1 wherein said gaseous laser medium comprises XeO.

7. The device of claim 1 wherein said gaseous laser medium comprises HgBr.

8. A device for optically pumping a lasing medium in a repetitive manner in a gaseous laser comprising:
   electrodes disposed within said lasing medium at opposite longitudinal ends of said laser;
   means for providing an electrical potential between said electrodes;
   accelerator means for generating a pulsed electron beam which produces a sufficiently uniform longitudinal preionization path along the axial direction of said laser between said electrodes to cause said electrical potential to produce an electrical discharge between said electrodes to form a substantially uniform plasma channel along said preionization path,
   said substantially uniform plasma channel having sufficient blackbody radiation determined by said means for providing an electrical potential to optically pump said lasing medium.

9. The device of claim 8 wherein said gaseous lasing medium comprises $I_2$.

10. The device of claim 8 wherein said gaseous lasing medium comprises XeF.

11. The device of claim 8 wherein said gaseous lasing medium comprises I.

12. The device of claim 8 wherein said gaseous lasing medium comprises $S_2$.

13. The device of claim 8 wherein said gaseous lasing medium comprises XeO.

14. The device of claim 8 wherein said gaseous lasing medium comprises HgBr.

15. A method of optically pumping a repetitively operated gaseous laser comprising:
   placing electrodes at opposite axial ends of said gaseous laser in a predetermined gaseous lasing medium;
   providing an electrical potential between said electrodes;
   producing a substantially uniform repetitive preionization path in said predetermined gaseous lasing medium in the axial direction of said laser between said electrodes;
   providing an electrical potential between said electrodes having sufficient magnitude and current to produce a plasma channel between said electrodes, guided by said preionization path, having a blackbody temperature which is capable of optically pumping said gaseous lasing medium.

* * * * *